United States Patent [19]
Green et al.

[11] 3,828,934
[45] Aug. 13, 1974

[54] MEDIA FOR WOUND FILTER ELEMENTS

[75] Inventors: John S. Green, Lebanon; John E. Luttrell, Tell City; James E. Schmitz, Indianapolis, all of Ind.

[73] Assignee: The Carborundum Company, Niagara Falls, N.Y.

[22] Filed: Oct. 9, 1973

[21] Appl. No.: 404,840

Related U.S. Application Data
[63] Continuation of Ser. No. 223,167, Feb. 3, 1972, abandoned.

[52] U.S. Cl............... 210/457, 210/494, 210/497.1
[51] Int. Cl........................................... B01d 27/00
[58] Field of Search................. 210/494, 497, 457

[56] References Cited
UNITED STATES PATENTS

| | | | |
|---|---|---|---|
| 3,065,856 | 11/1962 | Goldman | 210/494 |
| 3,356,226 | 12/1967 | Miller, Jr. et al. | 210/497 |
| 3,398,837 | 8/1968 | Adams | 210/497 |

*Primary Examiner*—Frank A. Spear, Jr.
*Assistant Examiner*—F. F. Calvetti
*Attorney, Agent, or Firm*—David E. Dougherty; William H. Holt

[57] ABSTRACT

Filter cartridges formed by winding yarn or roving in a honeycomb pattern around a center core are made with improved porosity control and filtration capacity by using a substrate to which fibers are attached or flocked before winding. Substrates of varying diameter and composition may be used and may have fibers of varying length, diameter and composition attached, depending on the porosity and filtration rate desired in the finished cartridge.

9 Claims, 5 Drawing Figures

MEDIA FOR WOUND FILTER ELEMENTS

This is a continuation of copending application Ser. No. 223,167 filed Feb. 3, 1972, now abandoned.

BACKGROUND OF THE INVENTION

This invention relates to improvements in filter cartridges comprising a yarn or roving wound into tubular form, the element being highly desirable for the filtering of substantially any liquid ranging from low viscosity to fairly high viscosity, although in some instances it might also be used for the filtration of gases, as will be apparent to one skilled in the art.

In general, filter cartridges have been formed of a fibrous yarn or roving wound into tubular form so as to define a number of diamond shaped honeycomb overlapping patterns which form inwardly narrowing passages from the outside of the tube to the inside thereof, the yarn being napped so as to provide a network of fibers extending across each of the passages.

In the past, such filter cartridges have been used extensively for the filtering of various liquids, including beverages, oils, chemicals and the like. Those filters were usually formed of cotton or viscose rayon yarn, napped to provide fibers extending across the passages or channels therein. Napping of the yarn was necessary to give a network of fibers extending across the filter channels in the cartridge, thereby providing a media for the retention of particles from the filter fluid. Filter cartridges designed for ultrafine filtration were napped more deeply to give a denser network of fibers. Deep napping was undesirable, however, since the winding yarn or roving was weakened during the napping process. This meant that heavier yarn had to be used with a consequent reduction in filter capacity, since most of the liquid in this type of filter passes through the spaces between the yarns and not through the yarn itself. Close attention was also necessary during winding to insure that the ends of the napped fibers were securely anchored by the adjacent windings of yarn. In filter cartridges of this type, the density of the fiber media, as formed by napping, may vary from point to point along the yarn as it is wound, depending to a considerable degree on the yarn density, the interlocking of the fibers in the yarn and the degree of napping treatment applied.

These disadvantages are overcome by this invention which provides an improved yarn or roving which does not require any napping treatment during the winding of the filter cartridge. The invention further provides a basic substrate having fibers attached thereon prior to winding and allows a selection of stronger substrates of lesser diameter but having attached fibers of controlled length and density. This permits filter cartridges of greater capacity compared with those previously known. These and other advantages of the invention will become apparent by reference to the following figures and detailed description. For the disclosure, a substrate in the description of the invention shall be defined as any string-like substance upon which fibers are attached or flocked. Flocked yarn shall be defined as a substrate upon which fibers have been flocked or attached.

SUMMARY OF THE INVENTION

The invention consists of a mechanically self-sustaining porous tubular filter element constructed from a substrate having a plurality of fibers attached thereto, said flocked yarn being wound back and forth in spaced criss-cross fashion into a tubular cartridge and providing a tunneled wall of substantial thickness about a perforated support core.

DETAILED DESCRIPTION OF THE INVENTION

Figure 1:
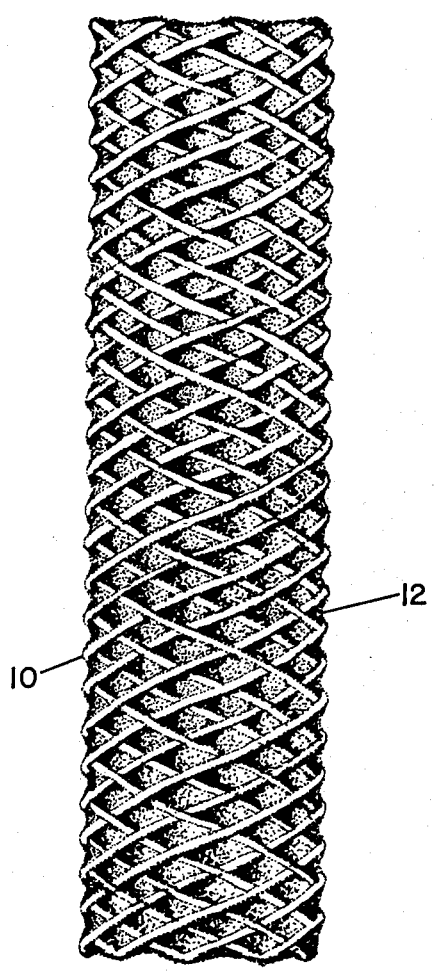
FIG. 1 is a side elevational view of a wound filter cartridge.

The illustrated embodiment of the invention is a filter cartridge generally indicated in FIG. 1 and is made up of a flocked yarn 10 which can be a yarn of cotton fibers, viscose rayon, cellulose acetate, or other synthetic or natural fibers or metallic fibers. The flocked yarn used may be satisfactorily from about 0.15 to about 2 inches in overall diameter, depending upon the character and use intended for the ultimate filter cartridge.

Figure 2:
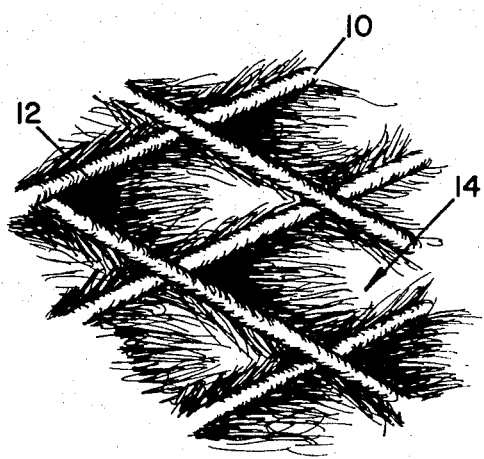
FIG. 2 is a fragmentary magnified view of the surface of the filter cartridge of FIG. 1.

The flocked yarn is wound around a perforated core. The winding is in successive layers and the flocked yarn is wound in helical convolutions spaced along the core in one direction, and then in the opposite direction in criss-cross manner. This provides rhombic or diamond-shaped openings 12 between successive layers, as seen in FIGS. 1 and 2. During the winding, the strands of subsequent layers should be placed uniformly over the strands of previous layers, but the crossing points of the strands are preferably moved slightly as to circumferential position as the tubular element is built up, thus causing the spaces 12 in a successive layer to form involute tunnels or passages. In such a filter cartridge approximately 10 inches in length, 2 ½ inches in diameter with a 1 inch central opening therethrough, there may be 300 or more such channels or passages 14. The passages extend from the outside of the unit to the inside thereof.

As previously pointed out, the napping operation is an undesirable one and according to the invention is eliminated by winding with flocked yarn which has fibers already attached. The flocked yarn may be prepared by attaching or flocking suitable fibers upon a substrate which has been treated with an adhesive. The substrate may be either a natural fiber such as cotton or wool or a synthetic such as a nylon, rayon, polyester or acrylic fiber. The substrate may be a blend of both natural and synthetic fibers or may contain inorganic fibers made from carbon, asbestos, glass or similar fibrous ceramics, such as aluminum silicate. Fibrous forms of metals such as copper and stainless steel may also be used. Substrate diameters may range from about 0.01 to about 0.25 inch.

The fibers, which are attached to the substrate, can be made of the same classes of material as described for the substrate, the fibers being of much smaller diameter, however, being within the range of about 10 to about 90 microns. Fiber length is important and may vary in a range from about 0.03 to about 1 inch in length, depending on the degree of filtration desired.

Figure 5:
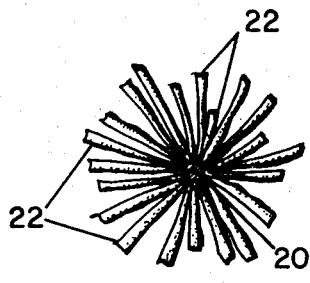
FIG. 5 is similar to FIG. 4, showing a substrate of smaller diameter.
Figure 4:
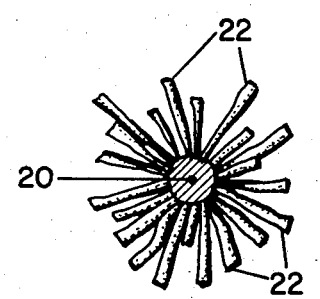
FIG. 4 is a magnified end view of a section of flocked yarn before winding, showing the attachment of fibers to a substrate of comparatively large diameter.
Figure 3:
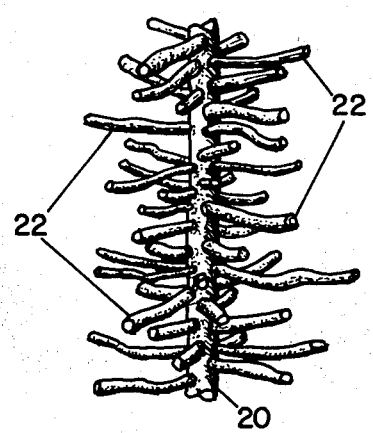
FIG. 3 is a magnified side view of a section of flocked yarn before winding, showing the attachment of the fibers thereon.

In the manufacture of the winding material, the selected substrate is first treated with a suitable adhesive and the fibers then applied; for example, by electrostatic methods. A flocked yarn prepared by this method is shown in FIG. 3 in which a side view of the substrate 20 is shown with a plurality of fibers 22 attached. The fibers may be either of uniform or of varying lengths and may be attached to substrates of varying diameters as shown in end views in FIGS. 4 and 5. The method of fiber attachment is not part of the invention and will not be further described other than to point out that this method allows the control of fiber density along the substrate as well as the control of fiber length. Filter cartridges made from the flocked yarn may be wound as previously described, regulating the spaces between turns of the yarn to correspond to the length of the fibers attached to the substrate. Filter porosity is readily controlled by using flocked yarn with a controlled fiber density and flock length. If necessary, the cartridge may be treated after winding with suitable resins to increase its compressive strength.

A further advantage of the invention is that a firm high strength substrate of small diameter may be used as a fiber carrier, while the attached fibers may be of some softer material which will form a superior filtering media. The result is an extremely versatile material of construction, whereby a substrate of high tensile strength and superior chemical or temperature resistance may be combined with a fibrous material of lower tensile strength but having desirable qualities as a filter media. Filter cartridges formed with a flocked yarn or roving therefore exhibit greater strength and filtering capacity as compared to cartridges formed from conventional napped yarns; the flocked yarn allowing the successful use of fibrous material hitherto unavailable for this type of filter construction. The use of the flocked yarn also permits winding of filter cartridges therefrom at a higher rate of speed because of the improved strength of the flocked yarn as compared with conventional rovings.

What is claimed is:

1. A mechanically self-sustaining porous tubular filter element constructed from a substrate having a plurality of fibers having ends thereof attached to said substrate, the substrate with attached fibers being wound back and forth in spaced criss-cross fashion into a tubular cartridge; said substrate having a diameter ranging from about 0.01 to about 0.25 inches and said fibers having diameters ranging from about 10 to about 90 microns and fiber lengths ranging from about 0.03 to 1 inch.

2. A filter element according to claim 1 in which said substrate has a plurality of fibers, each fiber having one end thereof directly attached to said substrate.

3. A filter element according to claim 1 in which the substrate comprises fibers selected from the group consisting of cotton, wool, nylon, rayon, polyester and acrylic fibers.

4. A filter element according to claim 1 in which the substrate comprises fibers selected from the group consisting of asbestos, glass and aluminum silicate.

5. A filter element according to claim 1 in which the substrate comprises materials from the group consisting of copper and stainless steel.

6. A filter element according to claim 1 in which the overall diameter of the substrate with attached fibers ranges from about 0.15 inch to about 2 inches.

7. A filter element according to claim 6 in which the fibers attached to the substrate comprise fibers selected from the group consisting of cotton, wool, nylon, rayon, polyester and acrylic fibers.

8. A filter element according to claim 6 in which the fibers attached to the substrate comprise fibers selected from the group consisting of asbestos, glass and aluminum silicate.

9. A filter element according to claim 6 in which the fibers attached to the substrate comprise fibers selected from the group consisting of copper and stainless steel.

* * * * *